Dec. 14, 1971    H. A. QUAM    3,626,678

TOOTH FOR HARVESTING EQUIPMENT

Filed June 17, 1970    2 Sheets-Sheet 1

INVENTOR.
HENRY A. QUAM

BY

ATTORNEY

Dec. 14, 1971  H. A. QUAM  3,626,678
TOOTH FOR HARVESTING EQUIPMENT
Filed June 17, 1970  2 Sheets-Sheet 2

INVENTOR.
HENRY A. QUAM
BY Robert L. Graham
ATTORNEY

United States Patent Office 3,626,678
Patented Dec. 14, 1971

3,626,678
TOOTH FOR HARVESTING EQUIPMENT
Henry A. Quam, Edmonton, Alberta, Canada, assignor to Imperial Oil Limited, Toronto, Ontario, Canada
Continuation-in-part of application Ser. No. 778,163, Nov. 22, 1968. This application June 17, 1970, Ser. No. 47,042
Int. Cl. A01d 77/00
U.S. Cl. 56—400            8 Claims

ABSTRACT OF THE DISCLOSURE

A one-piece tooth for use in harvesting pickup equipment wherein the base of the tooth is integral with the tine portion of the tooth; the base is also laterally resilient and deformable so as to snap into position on the pickup without the need for bolts, screws or other mechanical fastening devices. The bat or other tooth support means on the pickup is adapted to receive the base of the tooth in a releasable locking relationship.

CROSS-REFERENCE TO RELATED APPLICATIONS

This application is a continuation-in-part of application Ser. No. 778,163 filed in the U.S. Patent Office on Nov. 22, 1968, now abandoned.

FIELD OF THE INVENTION

This invention is useful in farm equipment employed to harvest cereal grains, hay and similar crops. It has application in machines that pick up windrowed and swathed grain as well as machines that assist or facilitate cutting and mowing equipment.

SUMMARY OF THE INVENTION

This invention resides in an improved type of tooth for farm equipment employed to pick up cereal grains, grass, hay and similar products. It has application in hay rakes, hay tedders and the like. It also has application in pickups which are used with combines and similar harvesting equipment. It is useful in a variety of revolving pickups, including draper or belt-type pickups, reel-type pickups and drum-type pickups.

The invention also resides in mounting means for releasably holding the new teeth on pickup equipment. The teeth are held without the need for bolts, screws or other mechanical fasteners. The teeth are also held such that they can be installed, removed or replaced on an individual basis.

Each tooth has a time portion and a base portion. The two portions are integral with one another and form a single unitary tooth structure. The teeth are preferably formed in one piece of nylon or other resinous or plastic material which is tough, resilient, flexible, and resistant to abrasion and wear. A particularly satisfactory tooth is one in which the tine and base portions are molded simultaneously and integrally from a suitable resin or plastic.

The tine portion of each tooth is elongated and preferably tapered from its base toward its tip. The tine can be circular, elliptical, ovate, or triangular in cross section. The noncircular, e.g. ovate, elliptical and triangular, configurations are mounted on the pickup with the long dimension in the direction of tooth travel. This arrangement provides strength and stability in the direction of greatest stress and yet permits the tooth to deflect laterally around stones or other foreign objects. The symmetrical, noncircular configuration has been particularly important in adapting teeth composed of nylon to the grain pickup service. While the nylon teeth exhibited improved wear-resistant properties, they became permanently deformed after prolonged use. Increasing the diameter of the circular tine would reduce the tendency of the tine to deform but would sacrifice lateral flexibility. By forming the tine in a noncircular cross section (oval) and placing the long dimension in the direction of tooth travel, the nylon teeth exhibited good stability in the direction of greatest stress and possessed the necessary lateral flexibility. Field tests have shown that nylon teeth provided with the oval tines resulted in a several-fold increase in the operating life of the teeth over acetal teeth having circular tines.

In addition to being tapered, each tooth is preferably curved into or towards the direction of loading and travel. The gradual curvature of the tooth provides for ready release of crop material and thereby minimizes wrapping.

The base portion of each tooth is designed to be mounted on pickup apparatus on an individual basis and without the need for separate mechanical fasteners. The design relies on the tough and resilient nature of the tooth material to enable the tooth to engage and to be held by the tooth mounting means. In a preferred form of tooth, the base is bifurcated having a lower trunk portion and two upper branches. One branch is thicker and stronger than the other branch and serves as the main strength member of the base. The other branch, which is more flexible than the thick branch, is provided with a button or similar protuberance or stepped portion which is capable of engaging a matching surface discontinuity in its associated mounting member.

The base of the tooth is adapted to enter within a suitable opening formed in the mounting member but it is dimensioned such that it must be compressed prior to such entrance. The lower trunk portion is dimensioned to fit snugly in the opening formed in the mounting member. Thus, the tooth is maintained in a secured position by the cooperative holding effects of the latching means and the snug fit provided by the base engaging the member. The tooth is thereby locked within the mounting member until such time as its withdrawal becomes desirable. At this point, the base is again compressed until the button or other discontinuity thereon is clear of the mounting means; the tooth is then withdrawn from the mounting means. No other tooth need be disturbed when a given tooth is installed and/or withdrawn from its mounting means.

The mounting means of the invention may take several forms, depending upon the type of pickup device involved. If the device is a pickup reel, the mounting member will generally be a bat, preferably formed of a strong, light metal such as an aluminum alloy. On the other hand, if the pickup is a draper or belt-type pickup, the mounting member will normally be a special mount which is attached to the belt or draper. In the latter instance, the mount may be any suitable strong and wear-resistant material. It should be sufficiently rigid to avoid being deformed while holding its teeth in a firmly locked relationship under conditions of load.

DESCRIPTION OF THE PREFERRED EMBODIMENT

Figure 1:
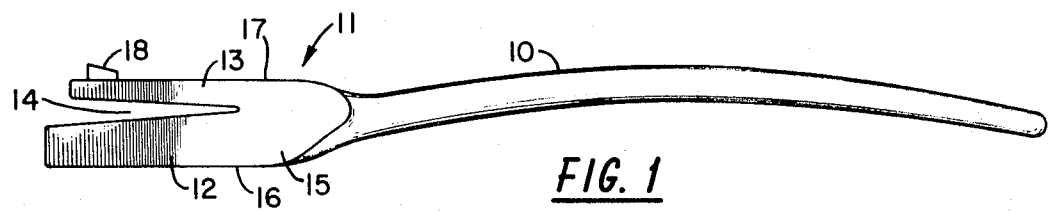
FIG. 1 is a side view of a tooth of the invention which is especially suitable for use in reel-type pickups.
Figure 2:
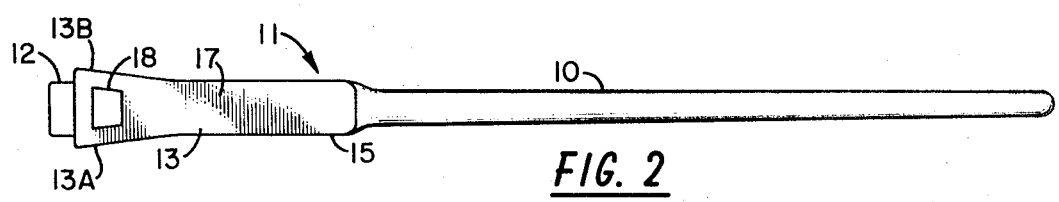
FIG. 2 is a view of the back of the tooth of FIG. 1— i.e., a view looking in the same direction as the travel of the tooth.

A preferred tooth embodiment of the invention is shown in FIGS. 1 and 2. As illustrated there, the tooth comprises a tine 10 and a base 11. The base 11 is bifurcated having a lower trunk portion 15 and upper branches 12 and 13 separated by slot 14. The trunk portion 15 is solid and is rectangular in cross section. The base 11 is formed with a flat leading surface 16 and a flat trailing surface 17. In the unstressed condition of the base 11, surfaces 16 and 17 are parallel. Formed in the upper end of branch 13 and extending perpendicularly from surface 17 is a protuberance or other discontinuity 18. The upper end of branch 13 is flared outwardly providing tapered surfaces 13a and 13b which are disposed on either side of protuberance 18.

The tine portion 10 is preferably curved into or toward the direction of travel, and it is preferably tapered gradually in cross section from its base to its point. In order to provide dimensional stability and structural strength in the direction of travel and still maintain lateral flexibility, it is preferred the tooth be noncircular in cross section with the longer dimension being oriented in the direction of travel. The noncircular cross section can be oval, triangular, or ovate in configuration. In order to provide equal lateral flexibility, the cross section should be symmetrical with respect to the dividing line defined by the longest dimension. The sectional dimensions referred to above lie in a plane perpendicular ot the longitudinal axis of the tine 10.

The tooth of FIGS. 1 and 2 can be formed of any suitable material consistent with the requirements of the tooth for picking up grain, hay, and other farm products. The tooth, however, is preferably formed in one piece of a suitable resilient, tough, flexible and wear-resistant plastic material. Suitable plastics include polypropylene, nylon, polycarbonate, and homopolymers and copolymers of acetal. These materials are commercially available in unfilled or filled forms. An especially effective tooth is a one piece structure formed by extruding nylon. This form of tooth has proven to be markedly resistant to breakage and abrasive wear; it is also highly effective in lifting and handling grain. It is very quiet in operation relative to steel teeth and it is inexpensive to construct. It is sufficiently resilient and strong to firmly engage a reel bat or other tooth mounting means.

Figure 3:
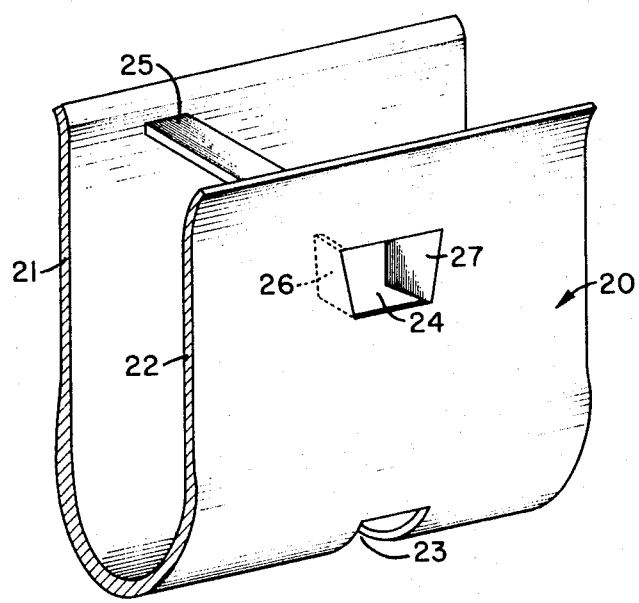
FIG. 3 is an isometric view of a portion of a metal bat for use with the tooth of FIG. 1 in a reel-type pickup.

FIG. 3 shows one portion along the length of a reel bat 20 for use with the tooth of FIGS. 1 and 2. Unlike conventional wooden bats, the bat in this instance is preferably constructed of a light, strong metal such as aluminum or an aluminum alloy. The bat 20 is simply a U-shaped member with parallel legs or flanges 21 and 22. The space between the flanges 21 and 22 is about equal to the space separating the leding and trailing surfaces 16 nd 17 of the tooth base 11. A punched-out opening 23 in the U-bend portion of the bat 20 is designed and dimensioned to receive the lower base portion 15 in close conformity. A second opening 24 is formed in one of the flanges to receive the protuberance 18 in the base portion 11. The opening may be conveniently formed by cutting two small doors in the flange and thereafter folding the doors inward of the bat to form oppositely facing flanges 26 and 27. These flanges are downwardly converging and are positioned to mate with tapered surfaces 13a and 13b of the base 11 (see FIG. 5).

The bat of FIG. 3 must be sufficiently strong to contain the teeth that are mounted therein. It must also resist deformation which might otherwise permit the teeth to become loose or dislodged from the bat. Flanges 21 and 22 accordingly should be made thick and strong enough to retain their shape while engaged in pickup operations. Reinforcing cross members 25 may be supplied as desired to help the flanges maintain their parallel relationship. These reinforcing members can be unitary portions of the bat itself or they can simply be separate members which are tack welded or otherwise secured to the upper edges of the flanges 21 and 22.

Figure 4:
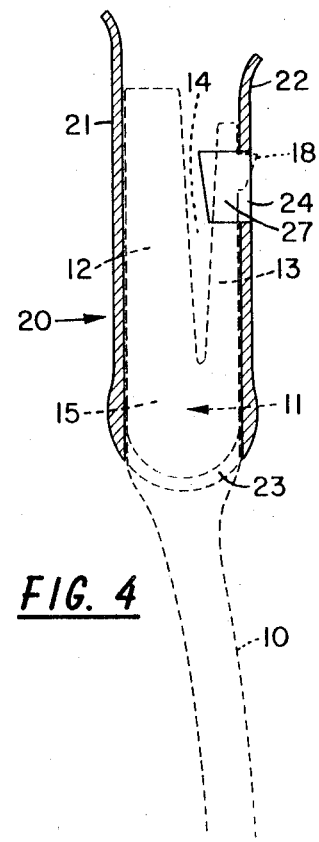
FIG. 4 is a cross sectional end view of the bat of FIG. 3 showing the tooth of FIGS. 1 and 2 in position within the bat.
Figure 5:
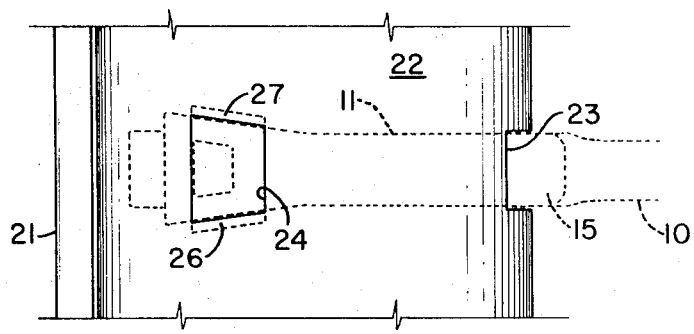
FIG. 5 is a rear view of the bar showing the tooth of FIGS. 1 and 2 in position within the bat.

FIGS. 4 and 5 show the tooth locked in position on the mountng bar 20 with the tooth being illustrated in phantom. In mounting the tooth, the tine portion 10 is directed downwardly the flanges 21 and 22 through the opening 23. The base portion 11 slidingly passes between the flanges 21 and 22 until the button 18 engages the flange 22. Further downward movement causes the flexible branch 13 to deflect toward the main branch 12, permitting the base to be completely inserted between the flanges 21 and 22. When the button 18 clears the opening 24, the resiliency of branch 13 forces it outwardly beyond the outer surface of the flange 22. At this point, the trunk portion 15 is snugly fit in the opening 23 anchoring the base 11 therein. The leading and trailing surfaces 16 and 17 lie flush against the confining walls provided by the flanges 21 and 22, respectively. The tapered surfaces 13a and 13b of the base 11 engage the flanges 26 and 27 preventing lateral movement thereof. Upward movement of the tooth is prevented by the top surface of protuberance 18 engaging the upper edge of opening 24. Thus it is seen that the tooth is maintained in the proper attitude by confinement in the opening 23 and the latching means on branch 13 engagement on the associated latching means on the flange 22.

Alternatively, the opening 24 can be sized to receive the protuberance 18 in close conformity and thereby serve to hold the upper end of the tooth from lateral as well as vertical movement. In this arrangement, the flanges 26 and 27 are not needed.

To remove the tooth from the bat 20, the button 18 is simply pressed inward until it is inside the bat 20. Simultaneously an upward pushing force is exerted on the tooth whereby the tooth slides upwardly and out of the bat 20. Slot 14 of the tooth must, of course, be wide enough and the tooth itself must be flexible enough to enable the proper amount of depression of protuberance 18 to occur.

Figure 6:
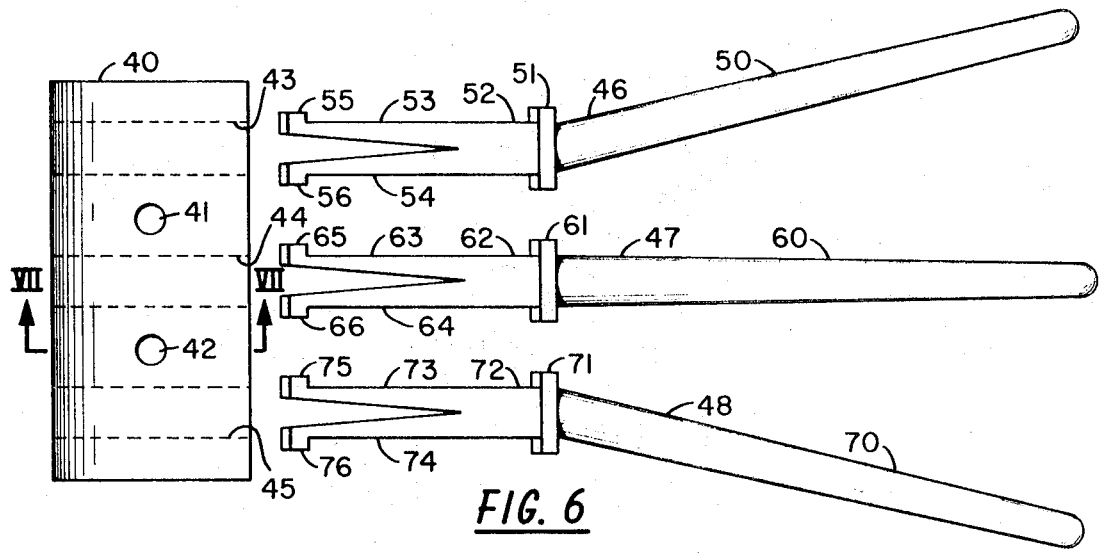
FIG. 6 is a plan view of three teeth and a suitable mount for installation on a draper or belt-type pickup.
Figure 7:
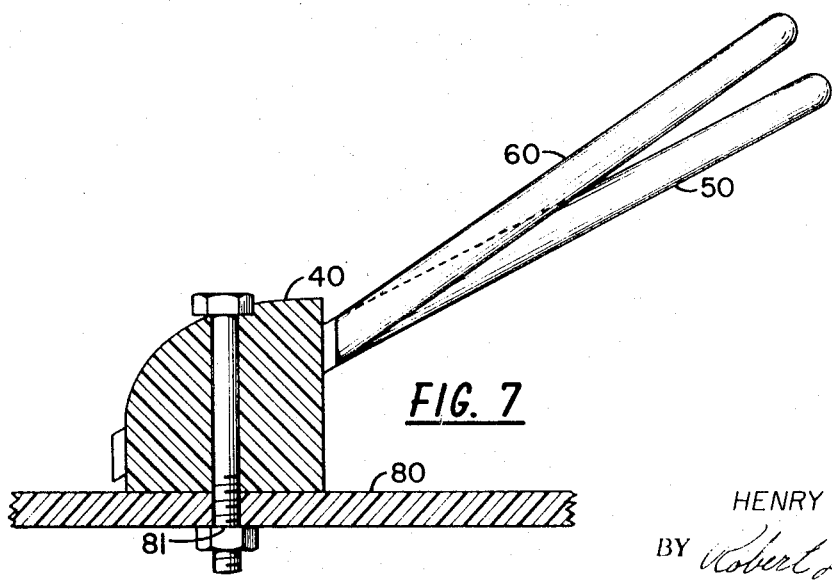
FIG. 7 is a view along section lines VII—VII of the mount of FIG. 6 showing how the teeth and mount of that figure may be assembled and mounted on a draper or belt-type pickup.

FIGS. 6 and 7 illustrate a form of tooth mount and a matching set of teeth which are especially suitable for use in draper or belt-type pickups. Referring first to FIG. 6, mount 40 and three teeth 46, 47, and 48 are shown in a plan view as they would appear prior to assembly on the surface of a belt. Mount 40 is simply a block of material strong enough to resist wear and tear, and to hold the teeth rigidly and securely in position. It can be fabricated of a metal such as an aluminum alloy, steel, or the like. It is preferably constructed, however, of a tough, hard synthetic resin, plastic, rubber or the like. It is provided with as many bolt holes 41 and 42 as may be required to hold this member securely to a belt by means of bolts or the like. It is also provided with enough holes 43, 44, and 45 to receive the teeth 46, 47, and 48. Each one of these teeth has a tine, a base, and a flange or shoulder between the tine and the base. The base of each tooth is bifurcated to form two branches or legs, each of which terminates in a button or equivalent stepped portion. Thus, tooth 46 comprises tine 50, flange 51, base 52, legs 53 and 54, and buttons 55 and 56. Tooth 47 has tine 60, flange 61, base 62, legs 63 and 64, and buttons 65 and 66. Tooth 48 has tine 70, flange 71, base 72, legs 73 and 74, and buttons 75 and 76.

To insert tooth 46 into mount 40, legs 53 and 54 are simply squeezed together until the buttons 55 and 56 can fit within hole 43. The tooth is then pushed into the hole until the buttons 55 and 56 travel the length of the hole and snap into an expanded locking position on the opposite side of the mount. Flange 51 is spaced from buttons 55 and 56 a distance such that the surfaces of the flange and the buttons which face inward toward base 52 engage outer surfaces of mount 40 when the tooth is properly positioned and locked within the mount.

Teeth 47 and 48 are locked within holes 44 and 45 in a manner similar to tooth 46. All three teeth, however, preferably have slightly different orientations of their tines. Thus, tines 50 and 70 angulate away from each other as well as from center tine 60. At the same time, however, the tip of center tine 60 is preferably tilted so as to be farther removed from a draper or belt than the tips of tines 50 and 70. This combination of lateral and vertical angulations has been found to provide improved efficiency of pick-up with a minimum of rock or stone being rolled or carried into the swath. The extent of lateral angulation of tines 50 and 70 will vary somewhat with factors such as tine length. A lateral angulation of about 20° to 30° relative to central tine 60, however, has been found to be generally satisfactory.

The extent of vertical angulation of central tine 60 relative to outer tines 50 and 70 will also vary somewhat with conditions. Generally speaking, however, an angulation of about 5° to about 15°, and preferably about 7° to 10°, will be adequate.

The vertical angulation of central tine 60 relative to tines 50 and 70 is illustrated in FIG. 7. There tines 50 and 60 are shown secured within mount 40; and mount 40, in turn, is shown secured to belt or draper 80 by means of bolts 81.

Assemblies of the type shown in FIGS. 6 and 7 can be staggered on a belt or draper pickup such that the travel paths of the outer two teeth in each assemlby tend to overlap the travel paths of outer teeth in adjacent assemblies. This and other modifications of the invention will be apparent to those skilled in the art.

As mentioned earlier, the teeth of the invention may be made from a variety of materials, Delrin 100, an acetal resin; Adiprene, a urethane elastomer, both of which are products of E. I. du Pont de Nemours and Co., Inc., and Rilsan, a nylon 11 product of Aquitaine-Organico, are suitable materials. Other suitable materials are polypropylene and polyethylene elastomers.

Emphasis has been placed in this application on teeth whose tine portions curve into or toward the direction of tooth travel. It will be apparent that other tine configurations may be preferred by particular operators or in particular operations. Hence, teeth that are straight or that curve or angulate in directions other than toward the direction of tooth travel are also within the scope of this invention. Further, the discontinuities in the surface of the base of the teeth and in the tooth mounting means can take a variety of shapes and configurations; it is necessary only that these discontinuities be latch-like and engage one another in a releasable, latching relationship when the teeth are in operating condition.

I claim:

1. A one-piece tooth composed of an elastomeric polymer for use on a revolving pickup apparatus, which comprises a base adapted to be mounted on said apparatus for movement therewith, said base having two branches, one of said branches being resiliently flexible to permit said tooth to latch onto said apparatus; a longitudinal tine integrally formed with the base and depending therefrom, said tine having a symmetrical, noncircular cross section in a plane perpendicular to the longitudinal axis of said tine, the longest linear sectional dimension extending in the direction of tooth movement.

2. The invention as recited in claim 1 wherein said cross section is oval in configuration and the elastomeric polymer is nylon.

3. An apparatus for use in a revolving pickup for grass, grains, hay, and the like, which comprises a flexible, resilient, one-piece tooth composed of an elastomeric polymer having a base and a tine depending therefrom, said base including a lower trunk portion and a pair of branches extending upwardly therefrom, at least one of said branches being flexible to permit the branches to be compressed together, one of said branches having a surface discontinuity formed in its outer surface; and a mounting member having a passageway formed therein adapted to slidingly receive said tooth and an opening leading to said passageway, said opening being sized to receive said trunk portion in close conformity, said member also having a surface discontinuity associated with said passageway and adapted to latchingly engage the surface discontinuity on said base with said trunk portion anchored in said opening.

4. The invention as recited in claim 3 wherein said branches are aligned in the direction of movement and said mount member includes forward and rearward confining walls.

5. The invention as recited in claim 3 wherein said tooth is oval in cross section with the longest dimension being aligned in the direction of tooth movement.

6. The invention as recited in claim 3 wherein the elastomeric polymer is nylon.

7. Apparatus as defined in claim 3 wherein said tooth is flanked on its right and left by at least one tooth to thereby comprise a center tooth and at least two flanking teeth which, respectively, angle laterally away from said center tooth.

8. An apparatus as defined in claim 7 wherein the tip of the tine of said center tooth extends vertically farther from said tooth mount means than the tips of the tines of any of said flanking teeth.

References Cited

UNITED STATES PATENTS

| | | | |
|---|---|---|---|
| 1,528,692 | 3/1925 | Richardson et al. | 56—400 |
| 3,323,196 | 6/1967 | Renn | 56—400 |
| 3,344,908 | 10/1967 | Hofer | 56—400 X |
| 3,468,109 | 9/1969 | Reimer | 56—400 X |

ROBERT PESHOCK, Primary Examiner

J. N. ESKOVITZ, Assistant Examiner